United States Patent [19]

Heininger et al.

[11] Patent Number: 4,943,374
[45] Date of Patent: Jul. 24, 1990

[54] USE OF A MICROPOROUS MEMBRANE CONSTRUCTED OF POLYETHER SULFON AND HYDROPHILIZATION AGENT FOR THE FILTRATION OF BEER

[75] Inventors: Hans-Ulrich Heininger, Aschau; Wilhelm Munninger, Rohrdorf-Thansau; Ernst Pawlowsky, Bad Aibling, all of Fed. Rep. of Germany

[73] Assignee: Gessner & Co., GmbH, Fed. Rep. of Germany

[21] Appl. No.: 185,516

[22] Filed: Apr. 25, 1988

[30] Foreign Application Priority Data

Apr. 21, 1988 [DE] Fed. Rep. of Germany ....... 3813488

[51] Int. Cl.$^5$ ............................................. B01D 13/00
[52] U.S. Cl. ..................................... 210/651; 210/654; 210/500.41
[58] Field of Search .............................. 426/490, 422; 210/500.41, 490, 654, 651

[56] References Cited

U.S. PATENT DOCUMENTS

| 4,481,260 | 11/1984 | Hohml | 210/500.41 X |
| 4,612,196 | 9/1986 | Goldstein et al. | 426/490 X |
| 4,720,343 | 1/1988 | Walch et al. | 210/500.41 X |

FOREIGN PATENT DOCUMENTS

| 0208450 | 1/1987 | European Pat. Off. |
| 0228072 | 7/1987 | European Pat. Off. |
| 3533306 | 3/1987 | Fed. Rep. of Germany |

OTHER PUBLICATIONS

Menahem A. Kruas et al., "A New Sterilizing Microfiltration Membrane," Apr. 27, 1987.
J. Burose, *Brauindustrie*, No. 7, 828–831 (Jul., 1987).
G. Muller, *Brauwelt*, 18, No. 4, 138–141 (1985).
A. Reiter, *Brauwelt*, 18, No. 46, 2368–2373, (1985).

*Primary Examiner*—Frank Spear
*Attorney, Agent, or Firm*—Scully, Scott, Murphy & Presser

[57] ABSTRACT

The invention concerns the use of a microporous membrane constructed of polyether sulfon and a hydrophilization agent having a pore size which is within the range of between 0.1 and 1.2 microns for the filtration of beer. This membrane filter proves to be particularly suitable for the microbiological stabilization of the beer and for the separation of the turbid substances. The membrane makes it possible to remove the germs which are harmful to the beer and the harmful turbid substances and to simultaneously filter the beer with a high throughput and therefore economically and with low costs.

43 Claims, 4 Drawing Sheets

IR-spectrum

USE OF A MICROPOROUS MEMBRANE CONSTRUCTED OF POLYETHER SULFON AND HYDROPHILIZATION AGENT FOR THE FILTRATION OF BEER

FIELD OF THE INVENTION

This invention relates to the use of polysulfon membranes for filtration of beer in breweries.

BACKGROUND OF THE INVENTION

The effective separation of undesirable substances comprises an important step in brewing beer. Mechanical processes, such as centrifugation and filtration have the advantage against thermal processes, for example heating for short periods, and conservation agents, that the products are neither thermally nor chemically burdened.

The quality of the product and/or its purity as well as the production costs play dominating parts in the brewing of beer. It is therefore required of the filtration installations which are used in the brewing process that they remove the accumulating turbid substances and yeasts and the microorganisms which are harmful to the beer, and simultaneously they do not adversely affect the aroma, taste and foreign body neutrality of the beer, while operating economically. A maximal filtration effect with small filter surfaces, high filtration speeds and long filter service life are expected. The filtration processes which are most used at present in the breweries are cake filtration with diatomaceous earth as the filtration ancillary agent and layer filtration using fiber and filter layers which contain diatomaceous earth. The separation of the particles is based on a screening effect and on the adsorption effect of the filter material. The great consumption of diatomaceous earth and the lack of possibility of regeneration of this filtration ancillary agent leads to great strains on the environment, so that alternative methods are being sought for a less problematical clarification of the beer. Great progress could be achieved with the development of membrane filtration, in which thin and highly porous membranes having a defined pore size, composed of plastic or ceramic materials, are used as the screen. Preference is given to the use of polymer materials of cellulose mixed esters, polyamides, polyimides, polyurethanes, polysulfons and nylon 66, as well as polyolefins, in particular PTFE. The pore sizes and the pore size distribution can be deliberately controlled by the manufacturing process so that the membranes are adjusted to predetermined particle size, wherein the maximal pore size should not exceed the size of the particles which are to be separated. In contrast to the diatomaceous earth and sheet filters, by suitable selection of the filter membranes, a predetermined particle size can be separated (detained) with defined certainty irrespective of the flow speed, of fluctuations of the throughput and of pressure surges. Further advantages of the membrane filters are that they do not adversely influence the filtered beer by emitting particles or by changing the contents. The membrane filters can be easily checked for their modus operandi, are easily handled, have an unproblematical endurance behaviour and a low maintenance expenditure. The membranes are produced either as highly porous films or in capillary and/or tubular form and can be applied on a support. A distinction is made between flat membranes (disc filters, spiral wound cartridge or pleated cartridge, plate and frame filters, dynamic pressure filters) and tubular or capillary membranes, while the membranes can be arranged in the corresponding modular form.

The membrane process can be classified in accordance with the size of the particles to be separated. As regards the permeability of the respective filter membrane, a differentiation is made between reverse osmosis, ultra-filtration, micro-filtration and conventional filtration, while the borders between the individual filtration stages overlap:

| | SEPARATION LIMITS | | |
| --- | --- | --- | --- |
| | MG of the separable substances [g/mol] | Size of separable substances [μm] | Separable substances |
| Reverse Osmosis | $\leq 10\,000$ | $5.10^{-4}-5.10^2$ | molecules, ions |
| Ultrafiltration | 10,000–300,000 | $5.10^{-3}-0,5$ | macromolecules (proteins, polysaccharides), kolloids viruses |
| Microfiltration | 100,000–1,000,000 | $5.10^{-2}-50$ | microorganisms, bacteria, colloids, fine particles |
| Conventional Filtration | $\geq 1,000,000$ | $>5$ | particles |

The individual membranes are frequently different not only in their pore sizes, but also in the membrane structure. Thus a differentiation is made between symmetrical membranes, the pores of which pass through the membrane layer with the same width, and asymmetrical membranes, the pores of which expand from one side of the membrane to the opposite side of the membrane. If the open pore side of the membrane is facing the non-filtered portion the membrane has a higher capacity for impurities. If the open pore side of the membrane is facing the filtered portion, particles, which are smaller than the pore diameter can more easily pass through the membrane and are not retained in the interior of the membrane.

The filtration technologies can be subdivided into conventional dead-end filtration and into dynamic cross-flow filtration or dynamic pressure filtration. In the first case the filtration is performed in such a way that the solution to be filtered is applied under pressure on the filter and permeates the filter, while the retained particles remain on the filter surface or are arrested in the pores. The entire liquid to be filtered is pressed through the filter. Because when using this process a filter cake rapidly forms on the surface, which increases the flow resistance greatly and reduces the throughput, only small amounts or quantities which have already been largely clarified can be filtered. The dynamic filtration avoids this disadvantage in the process technology because the liquid to be filtered is not simply brought under pressure onto the filter surface but the major proportion is guided tangentially, i. e. parallel to the filter surface and perpendicularly to the flow of filtrate at great speed over the filter surface (cross-flow filtration) or because the filter surface is moved at greater speed (dynamic pressure filtration), and therefore respectively only a proportion of the liquid penetrates through the filter. The retained substances therefore are not stored on the surface of the filter, do not form any impermeable filter cake and do not block the pores of the filter, but are led away by the high flow speed along the surface of the filter and are concentrated in the non-filtered portion. Thereby a high filtrate quantity is achieved until the filter is clogged.

In the filtration processes in brewing, it is advantageous that germs which are harmful to the beer should be filtered out. This filtration is conventionally performed using a membrane in accordance with the dead-end filtration principle. The membrane filters which are used in practice having a pore size of 0.8 microns indeed possess a high throughput and high permeability at acceptable pressures and therefore function economically, but microbiological sterility with respect to the bacteria damaging to the beer cannot be guaranteed. If membranes are used with a smaller pore diameter (0.45 microns, 0.20 microns), the bacteria which are harmful to the beer are removed by the membranes, but an economical modus operandi and therefore low cost beer production is no longer possible, as a rule, because of the low throughput and the increased tendency to clogging.

In another important filtration process, the beer is freed on its way from the storage tank from yeast, turbid substances and bacteria. In the case of dead-end filtration as the filter agent for the separation of the chill haze which consists of protein agglomerates, diatomaceous earth is still used, which however has the disadvantages listed above of high consumption, lack of regeneration possibility and great environmental pollution. Filter materials such as ceramics, $Al_2O_3$ or polypropylene were tested as the membranes in a dynamic filtration for the separation of yeast and turbid substances, but they could not as yet achieve any technical breakthrough because of the low throughput.

In European patent application EP-A2 0 228 072 filter membranes are disclosed of polyethers, polyimides, polyamides and polyether sulfons having a pore size in the range from 0.02 to 20 microns. These membranes are used for preference in the electronic and pharmaceutical industries. There is no discussion in more detail of the use of these filters for the microbiological filtration of beverages, and in particular indications of the special problems of beer filtration are lacking.

BRIEF SUMMARY OF THE INVENTION

The invention is based on the object of discovering a membrane filter for the filtration of beer which on the one hand retains the bacteria harmful to the beer, on the other hand has high permeability (maximal filtrate volume until the clogging of the filter) for the beer to be filtered and which has a high throughput. The permeability influences the dimensions of the filter device and the frequency of replacement of the filter and it therefore constitutes a decisive economic factor. In order to guarantee great purity of the beer, the membrane used should as far as possible not contain any of the components which dissolve out during filtration of the beer, and moreover no filter particles should detach themselves from the membrane during the filtration process. For economic reasons and in order to prevent clogging of the filter by the coating of the internal filter surface the membrane should not bind large quantities of the material to be filtered. For sterlization and regeneration of the membrane filter, furthermore, high hydrolytic and chemical stability are required at extreme pH values and under extreme oxidation conditions, and moreover the membrane must be thermally resistant and have good mechanical properties. Apart from the filtration of the beer, for the separation of germs harmful to the beer, a suitable membrane filter is also to be found for the separation of the yeast and of the turbid substances from the beer, which overcomes the disadvantages of diatomaceous earth filters and of sheet filters and meets the same criteria as the membrane for microbiological stabilization of the beer.

The problem according to the invention is solved by a microporous membrane which contains polyether sulfon and hydrophilization agents and which possesses a pore size within the range between 0.1 and 1.2 microns. A membrane of this construction is suitable for the filtration of beer because it fulfills the conditions stated above. It is especially suitable for filtering out germs harmful to the beer by means of a dead-end filtration process while obtaining a microbiologically stable beer and also for the separation of turbid substances (protein agglomerates) and yeast by means of dynamic filtration. The membrane which is used for beer filtration in accordance with the invention contains preferably as the polyether sulfon a polyarylether sulfon having the units [—$C_6H_4$—$SO_2$—$C_6H_4$—O—]. Preferably the polyether sulfon is composed exclusively of this group. As the hydrophilization agent, hydrophile groups can be used which are integrated as substituents in the polyether sulfon or in the polyarylether sulfon. These groups are preferably selected from the series —$NR_2$, —$SO_3H$, —COOR, —OR, where R is an alkyl, aralkyl or aryl radical or a hydrogen atom. An adequate hydrophilization of the membranes can also be achieved if as the hydrophilization agent at least one hydrophile polymer is used which is copolymerized with the polyether sulfon or is mixed in a mixture with the polyether sulfon. In particular polymers such as polyethylene glycol, polyvinylpyrrolidon, polyvinyl alcohol, polyvinyl acetate, polyacrylic acid, polyacrylic acid ester, but also various derivatives of cellulose and combinations thereof have been found to be suitable.

In a preferred embodiment the membrane used in accordance with the invention possesses an amount of the hydrophilization agent of from 0.05 to 20 % by weight based on the weight of the polyether sulfon, the range between 0.1 and 8 % by weight being especially favourable. Preferred hydrophile polymers are polyethylene glycol and polyvinylpyrrolidon which are advantageously used in an amount of 0.1 to 6 % by weight with respect to the amount of polyether sulfon.

The pore size of the membrane filter is preferably in the range from 0.2 to 0.8 microns, in particular from 0.45 to 0.65 microns. In another favourable application form, the membrane is slightly asymmetrical, whereby the magnitude ratio of the pores on one side of the membrane to those on the other side of the membrane opposite the first side may cover a range from 1.5 : 1 to 2.5 : 1. The membranes which are used show a high porosity, and the void volume amounts as a rule to more than 70 %.

The membrane filters which are favourable for breweries have at a pressure of 0.7 bar a water flow rate of from 10 to 200 ml/min.cm$^2$. Particularly advantageous are filters having a rate of from 30 to 65 ml/min.cm$^2$, which is high enough to guarantee, apart from a filtration which is sterile as regards the germs harmful to the beer, an economically advantageous filtration as well. The air flow rate has at a pressure of 0.7 bar values between 1 and 24 l/min.cm$^2$, the range from 4 to 8 l/min.cm$^2$ being particularly favourable. The bubble point with water in the case of the membranes used in accordance with the invention is within the range from 0.7 to 7.5 bar. Preferably membranes are used having a bubble point from 1.2 to 2.5 bar. The hydrophile membranes, after washing the membranes with a lower alcohol, for example methanol, have a contact angle with glycerine on the one side of the membranes of less than 40°, and on the opposite side of the membranes of less than 25°. The membranes which are used in accordance with the invention for beer filtration, after they have been washed with a lower alcohol and subsequently dried, are spontaneously and completely wettable with water so that no additional wetting agent is necessary for filtration.

In a particularly advantageous embodiment, in which a beer which is reliable microbiologically stabilized is obtained with sufficiently high throughput and therefore with low costs, the membrane filter has a pore diameter of 0.45 to 0.65 microns, a porosity greater than or equal to 70 %, a water flow rate of 30 to 65 ml/min.cm$^2$ (pressure: 0.7 bar), an air flow rate of from 4 to 8 l/min.cm$^2$ (pressure 0.7 bar), a bubble point with water of 1.2 to 2.5 bar and, after washing of the membranes with a lower alcohol, a contact angle with glycerine on the one side of the membranes of less than 40°, as well as on the opposite side of the membranes of less than 25°.

The membranes which are used according to the invention have a thickness of 50 to 300 microns, a range of 120 to 180 microns being preferred. The basis weight is preferably from 1.3 to 8.0 mg/cm$^2$ The range between 3.2 and 4.8 mg/cm2 is to be regarded as being especially favourable. The membranes are resistant against hydrochloric acid and caustic soda and therefore can be easily regenerated. Furthermore, the membrane filters can be treated in boiling water, in which process the share of material which is extractable amounts to less than 1.0 % by weight, preferably to less than 0.5 % by weight.

For use as filters, the membranes are advantageously provided with support materials for mechanical stabilization and are designed as flat filters (disc filters, spiral wound cartridge or pleated cartridge, plate and frame filters, dynamic pressure filters) or as tubular or capillary filters. The filters are arranged frequently in corresponding modules.

The membranes used according to the invention for beer filtration can be prepared by precipitation from a suitable solution. This solution comprises a polar, aprotic solvent, polyether sulfon, hydrophilization agents, wherein in particular polyethylene glycol and polyvinylpyrrolidon are suitable. The solvent is preferably selected from the series dimethylformamide, dimethylacetamide and N-methylpyrrolidon and is used in an amount of from 17 to 45 percent by weight based on the total solution. The weight of the polyethersulfon in the solution amounts preferably to from 10 to 15 %, while the weight of the polyethylene glycol amounts to from 40 to 70 %, respectively based on the total solution. If use is made of polyvinylpyrrolidon, the latter is preferably used in an amount of less then 1 percent by weight, based on the amount of the polyethersulfon. For the production of the membranes, polyethersulfon is dissolved in the aprotic, polar solvent, polyethylene glycol and polyvinylpyrrolidon are added to the solution and this is also dissolved. The solution thus obtained is pured as a layer and this is moistened subsequently to a sufficient extent to precipitate the membrane.

BRIEF DESCRIPTION OF THE DRAWINGS

For a better understanding of the invention and to show how the same may be carried into effect, reference will now be made by way of example to the accompanying drawings in which.

DETAILED DESCRIPTION OF PREFERRED EMBODIMENTS

The membrane filters which are used according to the invention in breweries fulfill the requirements initially listed. By comparison with the conventionally used membranes they make possible, with the given pore size and therefore with the given retention capacity, a particularly high flow rate and a large throughput. Therefore a sterilizing filtration with respect to the germs harmful to the beer can be achieved with sufficiently high throughput and in an economically favourable modus operandi. On the other hand, the high throughput which is attainable and the easy regenerability of the membranes make it possible that the diatomaceous earth layer filters can be replaced advantageously during the separation of the turbid substances and of the yeast. The advantages of the membranes used in accordance with the invention are made clear in the following Table 1, in which the maximal permeability $V_{max}$ (hl beer/m$^2$) of a selected type of beer is compared for various membrane materials which are all suitable for sterile filtration of beverages.

TABLE 1

|  |  | $V_{max}$ [hl beer/m$^2$]; pressure = 1 bar |
|---|---|---|
| Pore Size 0,2 μm | Seitz (polysulfon) | 0,86 |
|  | Millipore (cellulose mixed ester) | 3,2 |
|  | Enka PP high flux (polypropylene) | 0,69 |
| Inventive Membrane: | Gelman Supor 200 (polyethersulfon) | 4,8 |
|  | Water flow rate: 22 ml/min.cm$^2$ (0,7 bar) |  |
|  | Air flow rate: 3 l/min.cm$^2$ (0,7 bar) |  |
|  | Bubble-Point (H$_2$O): 3,1 bar |  |
|  | Membrane thickness: 150 μm |  |
|  | extractable share: ≦1% |  |
| Pore Size 0,45 μm | Brunswick (asym. polysulfon) | 0,30 |
|  | Cuno (Nylon 66) | 4,1 |
|  | Millipore (polytetrafluorethylene) | 0,97 |

TABLE 1-continued

| | | $V_{max}$ [hl beer/m$^2$]; pressure = 1 bar |
|---|---|---|
| | Millipore (polyvinylidendifluoride) | 3,2 |
| | MSI (Nylon 66) | 4,3 |
| | Nuclepore (polycarbonate) | 1,6 |
| 0,81 | Nuclepore (polyester) | 0,81 |
| | Pall (nylon 66) | 2,6 |
| 2,0 | Seitz (polysulfon) | 2,0 |
| Inventive Membrane: | Gelman Supor 450 (polyethersulfon) Water flow rate: 35 ml(min.cm$^2$ (0,7 bar) Air flow rate: 5 l/min.cm$^2$ (0,7 bar) Bubble-Point (H$_2$O): 1,8 bar Membrane thickness: 150 µm extractable share: ≦1% | 13,7 |
| Pore Size 0,8 µm | Pall (Nylon 66) | 8,4 |
| | Schleicher und Schull (cellulose mixed ester) | 5,6 |
| Inventive Membrane: | Gelman Supor 800 (polyethersulfon) Water flow rate: 100 ml/min.cm$^2$ (0,7 bar) Air flow rate: 11 l/min.cm$^2$ (0,7 bar) Bubble-Point (H$_2$O): 1,1 bar Membran thickness: 150 µm extractable share: ≦1% | 21 |

Figure 1:
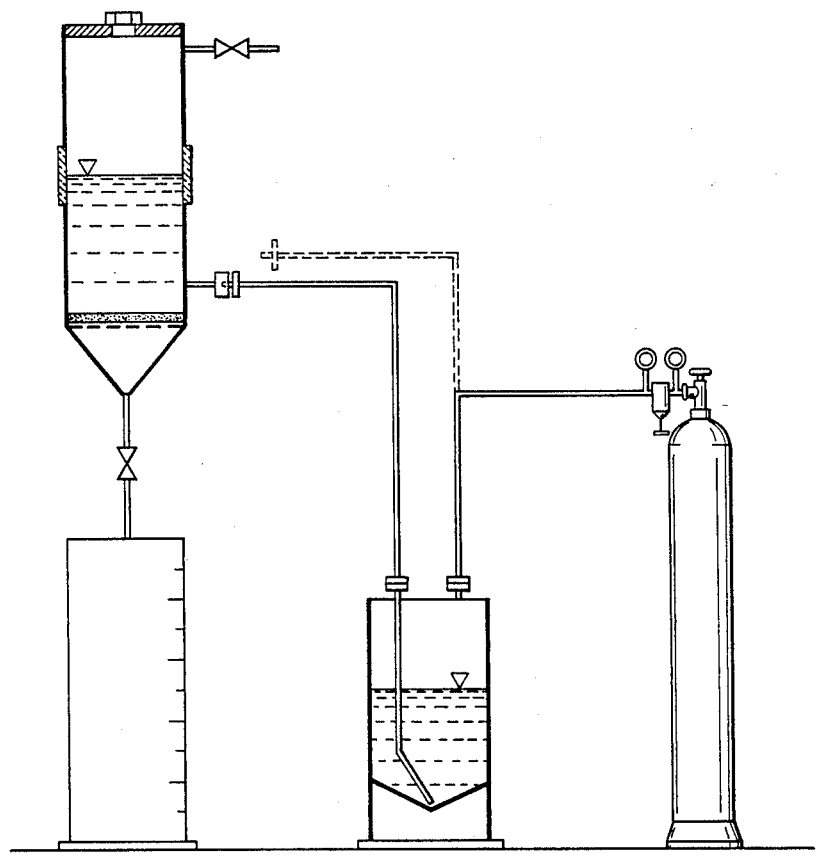
FIG. 1 illustrates a test arrangement for testing filters and according to the invention.

The test arrangement with which the maximal beer volume which can pass under the defined conditions and with a selected type of beer through a membrane disc filter with a diameter of 47 mm is detected is shown in FIG. 1.

In carrying out the test, the membranes are first placed in the filter holder, in which process hydrophobe membranes such as PP, PTFE, are completely wetted with ethanol. In the pressure filtration apparatus, approximately 230 to 250 ml water are poured into the pressure filtration apparatus, the water having been previously filtered through a 0.22 micron membrane to be particle-free, and the filtration apparatus is closed using the upper sealing plug. The CO$_2$ pressure flask, which is adjusted by an adjustable pressure reducer to 1 bar, is now connected via a plug to the filter holder. Thereby the selfclosing fast-couplings are opened and the pressure filtration apparatus is exposed to 1 bar CO$_2$ pressure. At the point in time $t_0$, the jamming clamp at the filtrate exit is opened. The filtered water is intercepted by a measuring cylinder, and the times $t_1$ and $t_2$ are measured at 100 ml and 200 ml throughput respectively. From this the water value of the membrane can be computed as volume/time in ml/min. The water value of the membrane is used to control the similarity of a membrane type. Subsequently the water is pressed completely through the filter, the rapid separation couplings are detached and the jamming clamp at the filtrate exit is closed.

The plug for the beer line of the container which holds maximally 18 l of beer is connected with the rapid separation coupling on the pressure filtration apparatus. Subsequently the jamming clamp on the upper tube olive is cautiously opened until the liquid level becomes visible in the area of the observation window. In the observation window it can be checked whether the membrane is still completely covered with liquid and therefore no partial blocking of the membrane surface takes place due to gas bubbles from the carbon dioxide content of the beer. The state of the liquid in the observation window does not change substantially because of the constant pressure conditions during filtration. Because of the supply pressure in the container from the pressure flask, there is also a pressure of 1 bar in the pressure filtration apparatus.

The jamming clamp at the filtrate exit is opened at the time $t_0=0$ and the filtered beer is intercepted using a measuring vessel. Consecutively the volume values $V_1$, $V_2, \ldots, V_n$ as well as the associated times $t_1, t_2, \ldots, t_n$ are recorded. The beer is filtered until such time as the flow in ml/min. amounts to approximately 1/5 of the initial flow (after the first 30 to 50 ml of beer).

In the evaluation the degree of regression is computed by the points $$\left( \frac{V_i + V_{i+1}}{2}, \frac{V_{i+1} - V_i}{t_{i+1} - t_i} \right)$$

for 0 less than or equal i less than n and $V_0=0$. For $V_0=0$ the maximal initial flow results, and for $V/t=0$ one obtains the maximal volume which can be filtered at 1 bar with the given filter surface. This can be recalculated into the unit hl beer/m$^2$ of filter surface and is shown in the Table 1 as $V_{max}$.

The test was carried out at 4±1° C. It is dependent on the type of beer which is used, so that the maximal volumes obtained do not represent absolute values, but are only used for purposes of comparison.

Figure 2A:
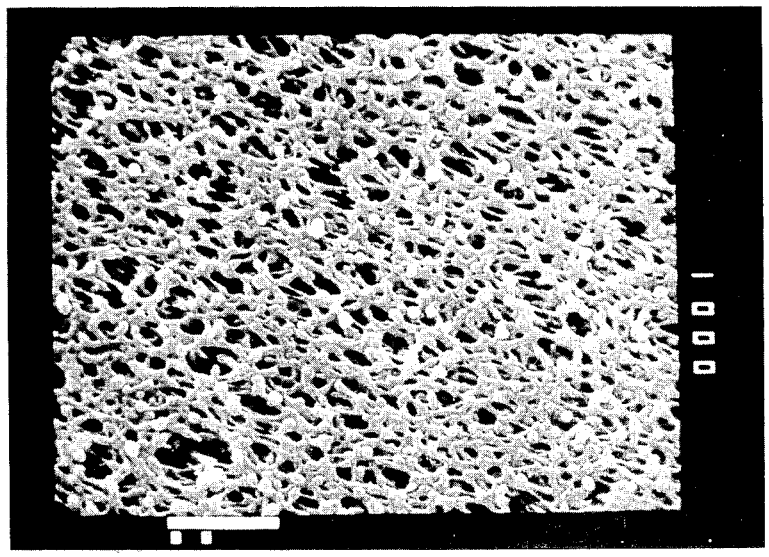
FIG. 2 is a screen electron microscope photograph.
Figure 2B:
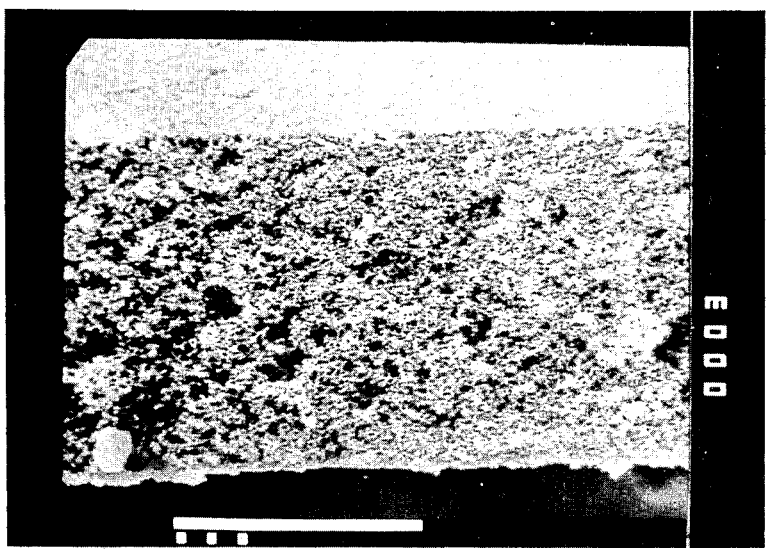
Figure 3:
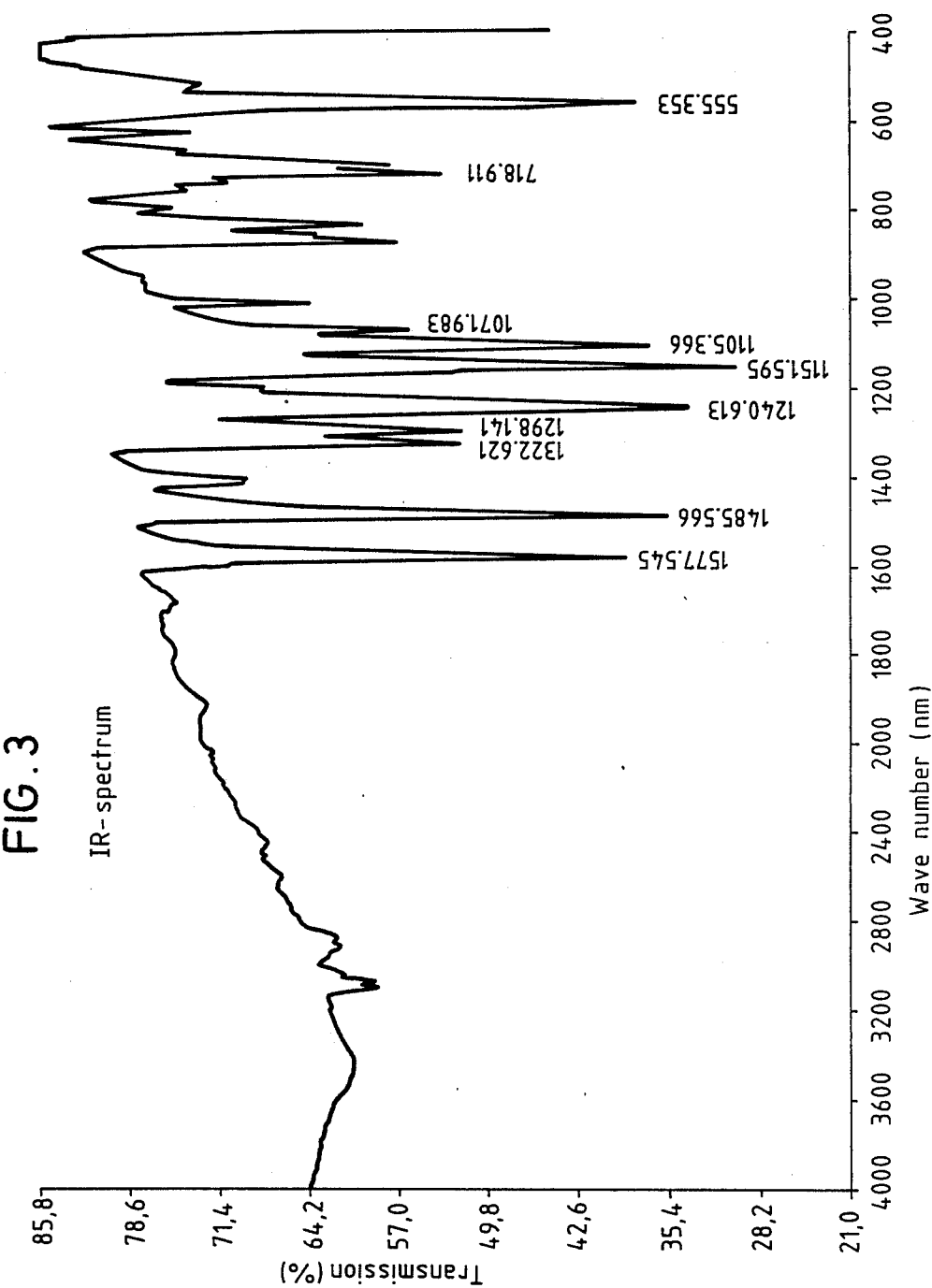
FIG. 3 is an infrared spectrum.
Figure 4:
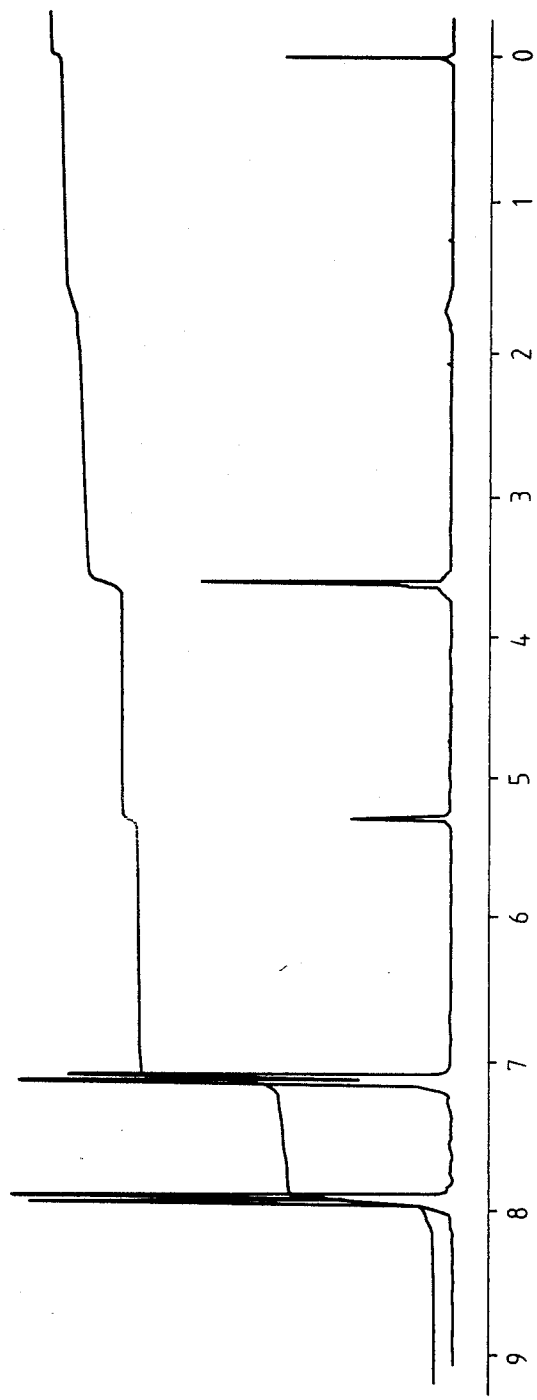
FIG. 4 is an NMR spectrum.

From Table 1 it can be seen that the different membrane filters for the special case of beer filtration have clear differences with respect to the maximal throughput quantity. At the given pore size, the maximal throughput of the membranes used according to the invention achieves respectively the highest values. The superiority is particularly clear and is surprising in its amount in the case of membranes having a pore size of 0.45 microns, of which in the enclosure a screen electron microscope photograph (FIG. 2), an infrared spectrum (FIG. 3) and a NMR spectrum (FIG. 4) are enclosed. Using this membrane, great progress in beer filtration is achieved, because with this pore diameter, together with a guaranteed separation of bacteria which are harmful to the beer, the beer can be filtered with a high throughput and therefore with low costs.

We claim:

1. A process for the separation of harmful germs, turbid substances and yeast from beer comprising filtering beer containing germs, turbid substances and/or yeast with a microporous membrane, constructed of polyether sulfone and a hydrophilization agent, having a pore size in the range of between 0.1 and 1.2 microns.

2. A process in accordance with claim 1 wherein the polyether sulfone constitutes a polyarylether sulfone having the repeating structural unit $-[C_6H_4-SO_2-C_6H_4-O]-$ 3. A process in accordance with claim 1 wherein hydrophilic groups are integrated in the polyether sulfone as substituents, as the hydrophilization agent.

4. A process in accordance with claim 3 wherein the hydrophilic groups are selected from the group consisting of $-NR_2$, $-SO_3H$, $-COOR$ and $-OR$, where R is an alkyl, aralkyl or aryl radical or a hydrogen atom.

5. A process in accordance with claim 1 wherein the hydrophilization agent constitutes at least one hydrophilic polymer, which is polymerized with the polyether sulfone or is mixed in a mixture with the polyether sulfone.

6. A process in accordance with claim 5 wherein the hydrophilic polymer is selected from the group consisting of polyethylene glycol, polyvinylpyrrolidone, polyvinylalcohol, polyvinylacetate, polyacrylic acid, polyacrylic acid ester, cellulose derivatives and combinations thereof.

7. A process in accordance with claim 6 wherein the hydrophilic polymer is present in a concentration in the range of from 0.1% to 6% based by weight, based on the weight of the polyether sulfone.

8. A process in accordance with claim 1 wherein the hydrophilization agent is present in an amount of from 0.05% to 20 % weight, based on the weight of the polyether sulfone.

9. A process in accordance with claim 8 wherein said hydrophilization agent is present in an amount of from 0.1% to 8% weight, based on the weight of the polyether sulfone.

10. A process in accordance with claim 1, wherein the pore size of the membrane is within the range of between 0.2 and 0.8 micron.

11. A process in accordance with claim 10 wherein the pore size of the membrane is within the range of between 0.45 and 0.65 micron.

12. A process in accordance with claim 1 wherein the magnitude ratio of the pores on one side of the membrane to the pores on the opposite side of the membrane is in the range of between 1.5:1 and 2.5:1.

13. A process in accordance with claim 1 wherein the void volume of the membrane is at least 70%.

14. A process in accordance with claim 1 wherein the water flow rate at a pressure of 0.7 bar is within the range of from 10 to 200 ml/min. $cm^2$.

15. A process in accordance with claim 14 wherein said water flow rate is in the range of between 30 and 65 ml/min. $cm^2$ at a pressure of 0.7 bar.

16. A process in accordance with claim 1 wherein the air flow rate at a pressure of 0.7 bar is between 1 and 24 l/min. $cm^2$.

17. A process in accordance with claim 16 wherein said air flow rate, at a pressure of 0.7 bar, is between 4 and 8 l/min. $cm^2$.

18. A process in accordance with claim 1 wherein the bubble point with water is from 0.7 to 7.5 bars.

19. A process in accordance with claim 18 wherein said bubble point is between 1.2 and 2.5 bars 20. A process in accordance with claim 1 wherein, after washing the membrane with a lower alcohol, the contact angle with glycerine is less than 40° on one side of the membrane and a contact angle of less than 25° on the opposite side of the membrane.

21. A process in accordance with claim 1 wherein the membrane, after washing with a lower alcohol and subsequent drying, remains spontaneously and completely wettable with water, with no additional wetting agent necessary for the filtration of the beer.

22. A process in accordance with claim 1 wherein the membrane has a pore diameter of from 0.45 to 0.65 micron, a porosity of at least 70%, a water flow rate of from 30 to 65 ml/min. $cm^2$ at a pressure of 0.7 bar, an air flow rate of from 4 to 8 l/min. $cm^2$ at a pressure of 0.7 bar, a bubble point with water of 0.2 bar to 2.5 bars and, after washing the membrane with a lower alcohol, a contact angel with glycerine of less than 40° on one side of the membrane and an angle of less than 25° on the opposite side of the membrane.

23. A process in accordance with claim 1 wherein the thickness of said membrane is from 50 to 300 microns.

24. A process in accordance with claim 23 wherein the thickness of said membrane is in the range of between 120 and 180 microns.

25. A process in accordance with claim 1 wherein the basis weight of the membrane is within the range of from 1.3 to 8.0 $mg/cm^2$.

26. A process in accordance with claim 25 wherein said membrane weighs between 3.2 and 4.8 $mg/cm^2$.

27. A process in accordance with claim 1 wherein the membrane is resistant to hydrochloric acid and caustic soda solution.

28. A process in accordance with claim 1 wherein less than 1.0% by weight of the membrane is extractable is boiling water.

29. A process in accordance with claim 28 wherein less than 0.5% by weight in extractable from said membrane is boiling water.

30. A process in accordance with claim 1 wherein the membrane is provided with support for mechanical stabilization.

31. A process in accordance with claim 30 wherein said supported membrane is designed as a flat filter selected from the group consisting of a disc filter, a spiral wound cartridge, a pleated cartridge, a plate and frame filter and a dynamic pressure filter.

32. A process in accordance with claim 30 wherein said supported membrane is designed as a tubular filter.

33. A process in accordance with claim 30 wherein said supported membrane is designed as a capillary filter.

34. A process in accordance with claim 1 wherein the membrane is formed by precipitation from a solution of a polar aprotic solvent, polyether sulfone and a hydrophilization agent.

35. A process in accordance with claim 34 wherein the polar aprotic solvent is selected from the group consisting of dimethylformamide, dimethylacetamide and N-methylpyrrolidone.

36. A process in accordance with claim 34 wherein the polar aprotic solvent is present in an amount of from 17% to 45% by weight, based on the total weight of the solution.

37. A process in accordance with claim 34 wherein the polyethene sulfone is present in the solution in an amount of from 10% to 15% by weight, based on the total weight of the solution.

38. A process in accordance with claim 34 wherein the membrane is produced by dissolving polyether sulfone in the aprotic polar solvent, adding polyethylene glycol and polyvinylpyrrolidone to the solution, the solution thus obtained poured into a thin layer and then adequately moistened to precipitate the membrane.

39. A process in accordance with claim 34 wherein said hydrophilization agent is selected from the group consisting of polyethylene glycol, polyvinylpyrrolidone and mixtures thereof.

40. A process in accordance with claim 39 wherein said hydrophilization agent includes polyethylene glycol present in a concentration in the range of between 40% and 70% by weight, based on the total weight of said solution.

41. A process in accordance with claim 39 wherein said hydrophilization agent includes polyvinylpyrrolidone present in said solution in a concentration of no more than 1% by weight, based on the weight of said polyether sulfone.

42. A process in accordance with claim 1 wherein said germs are filtered from said beer by means of static filtration.

43. A process in accordance with claim 1 wherein said turbid substances and said yeast are separated from said beer by means of dynamic cross-flow filtration or dynamic pressure filtration.

* * * * *